Nov. 25, 1969 — J. L. HICKERNELL — 3,480,341

FRICTION BEARING

Filed Oct. 16, 1967 — 2 Sheets-Sheet 1

James L. Hickernell
INVENTOR.

BY
ATTORNEYS

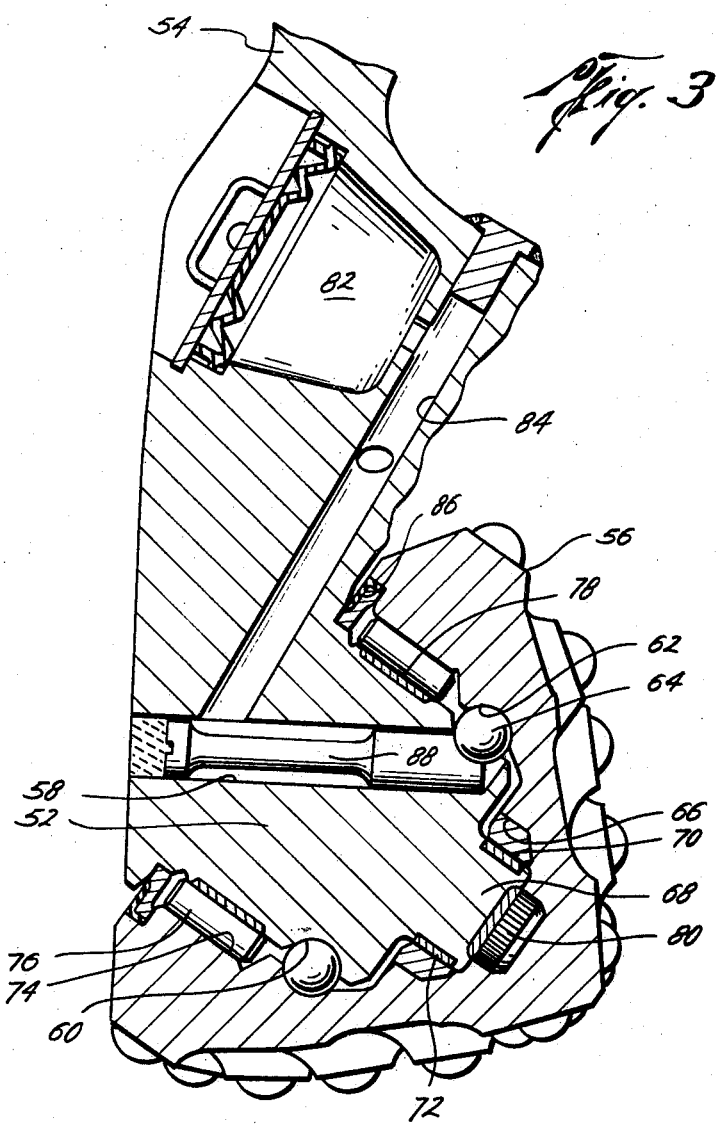

United States Patent Office 3,480,341
Patented Nov. 25, 1969

3,480,341
FRICTION BEARING
James L. Hickernell, Houston, Tex., assignors to G. W. Murphy Industries, Inc., Houston, Tex., a corporation of Texas
Filed Oct. 16, 1967, Ser. No. 675,424
Int. Cl. F16c 19/00, 29/00; E21b 9/08
U.S. Cl. 308—8.2                                    6 Claims

ABSTRACT OF THE DISCLOSURE

An improved friction bearing which in its preferred form is applied to a conical cutter-type earth boring drill bit and includes a sintered tungsten carbide bushing held in compression by the cutter, the tungsten carbide particles before sintering have a size range of 0.8 to 6 microns, the bushing engaging a tungsten carbide bearing surface on the shaft, the tungsten carbide particles forming said surface initially having a size of minus 30 mesh with a substantial portion of the particles having a size of minus 40 mesh. This abstract is neither intended to define the invention of the application which, of course, is measured by the claims, nor is it intended to be limiting as to the scope of the invention in any way.

---

The present invention relates to an improved hard surface friction bearing having application to an earth boring drill bit.

An object of the present invention is to provide an improved friction bearing capable of withstanding high bearing loads for long periods of time.

Another object of the present invention is to provide an improved friction bearing for an earth boring drill bit which provides adequate support for a conical cutter and effectively resists wearing action.

BRIEF DESCRIPTION OF THE DRAWINGS

These and other objects and advantages of the present invention are hereinafter set forth and explained with reference to the drawings wherein:

FIGURE 3 is a partial detailed sectional view of another form of bearing structure used in an earth boring drill bit.

DESCRIPTION OF THE PREFERRED EMBODIMENTS

Figure 1:
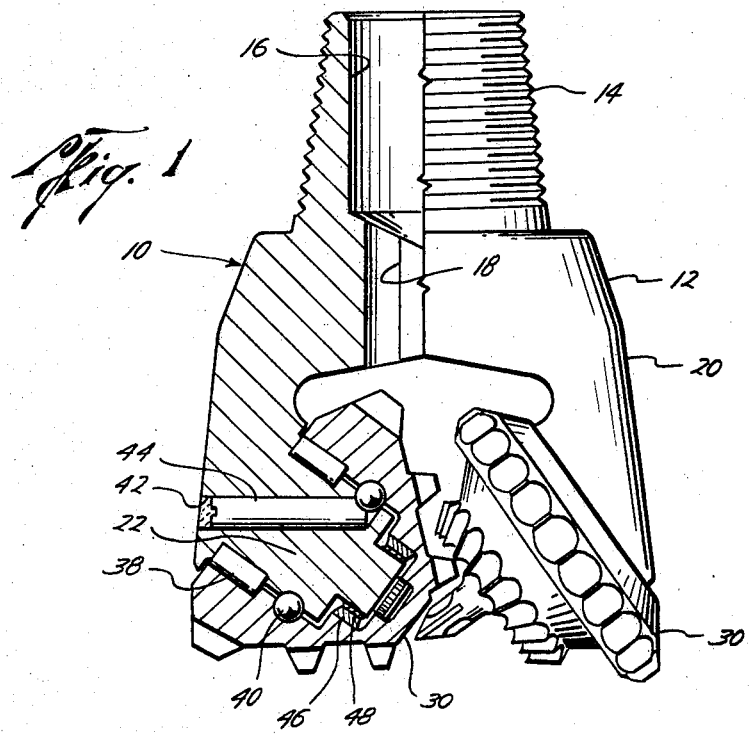
FIGURE 1 is an elevation view, partly in section of an earth boring drill bit embodying the friction bearing of the present invention.
Figure 2:
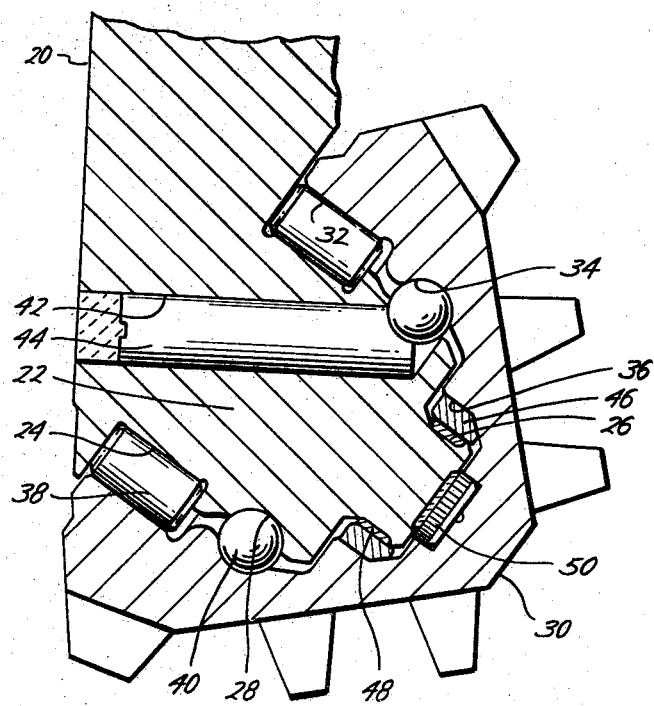
FIGURE 2 is an enlarged detailed sectional view of the bearing structure illustrated in FIGURE 1.

In FIGURE 1 an earth boring drill bit is shown generally at 10 comprising a head 12 having a threaded shank 14 extending upwardly and adapted to be secured to the lower end of a drill string (not shown). The head 12 has a chamber 16 and an opening 18 to receive and discharge drilling fluid pumped downwardly through the drilling string in the usual manner. As shown in FIGURES 1 and 2, a plurality of legs 20 depend downwardly from head 12 and each leg terminates in the inwardly and downwardly extending shaft 22. The shaft 22 defines the inner roller bearing race recess 24, the outer pin 26 and the ball bearing race recess 28, therebetween. A conical cutter 30 is mounted on the shaft 22 and defines the roller bearing race recess 32, the ball bearing race recess 34 and the recess 36. The recesses 24 and 32 form the race for the roller bearings 38. The recesses 28 and 34 form the race for the ball bearings 40. The bore 42 is defined in the arm 20 and shaft 22 for the introduction of the ball bearings 40 into their race. The bore 42 is closed by plug 44.

The friction bearing surfaces are provided by the sintered tungsten carbide bushing 46, which is positioned within the recess 38 of the cutter, and by the tungsten carbide material 48 which is heat deposited on the surface of pin 26 as shown to provide a metallurgical bond of such material to pin 26. The thrust button 50 is positioned in cutter 30 to bear against the outer end of pin 26.

In the form of the invention illustrated in FIGURE 3, the shaft 52 extends downwardly and inwardly from the leg 54, and is adapted to rotatively support the conical cutter 56 thereon. The bore 58 communicates with the race defined by the recess 60 in shaft 2 and the recess 62 in cutter 56 to allow the ball bearings 64 to be installed in the ball bearing race defined by recesses 60 and 62. The cutter defines a recess 66 surrounding the pin end 68 of shaft 52. The sintered tungsten carbide bushing 70 is inserted in recess 66 of the cutter 56. The bushing 70 engages the tungsten carbide material 72 which is heat deposited around pin 68 to provide a metallurgical bond of material 72 to pin 68. Cutter 56 defines the recess 74 which receives the sintered tungsten carbide bushing 76. As hereinafter explained, the recess 66 and bushing 70 and recess 74 and bushing 76 have an interference fit so that the bushings 70 and 76 are compressed when installed in their respective recesses 70 and 74. The end of shaft 52 closest to leg 54 includes the tungsten carbide material 78 which is heat deposited thereon to provide a metallurgical bond between the material 78 and the exterior of shaft 52. Bushing 76 engages the deposited material 78. Thrust button 80 positioned in cutter 56 engages the end of pin 68.

Lubrication is provided to ball bearings 64 from the reservoir 82, through the passage 84 defined in leg 54, the bore 58 into the ball bearing race. Seal ring 86 is provided to prevent leakage of lubricating fluid out between cutter 56 and leg 54. The retainer plug 88 is positioned in bore 58 to retain ball bearings 64 in their race and to close the outer end of bore 58.

The sintered tungsten carbide bushings (46, 70 and 76) are made from tungsten carbide particles having a size range of 6 microns and smaller, preferably from 0.8 to 5 microns with cobalt being used as a binder. The amount of cobalt binder used is from nine to fifteen percent by weight, preferably eleven percent by weight.

It has been found that initial loading of the sintered tungsten carbide bushings in compression increases their useful service life. A compression stress level in the sintered tungsten carbide bushing is preferred to be at least 100,000 p.s.i. and when the bearing structure is to be subjected to high loadings, higher stress levels (for example 160,000 p.s.i.) may be used to increase the service life of the bearing structure. This initial compression loading is readily achieved by providing a suitable interference fit between the bushing and its recess. Thus when the bushing is installed in its recess, it is compressed to the desired stress level. The tungsten carbide material deposits (48, 72 and 78) provide bearing surfaces which are engaged by their respective bushings to form the bearing structure.

This tungsten carbide material is formed of tungsten carbide particles which pass through a 30 mesh screen (size range of minus 30 mesh) and which has a preponderance of particles which pass through a 40 mesh screen (size range of minus 40 mesh). It is preferred that the particles of tungsten carbide be in the size range from minus 40 to plus 100 but some larger particles (plus 40 mesh, minus 30 mesh) may be tolerated as a small percentage of the particles used particularly where the minus 100 mesh sizes are included. A suitable material such as mild steel, is used as a matrix. The material is deposited by heat, as by using an atomic hydrogen or acetylene torch. A suitable fluxing agent such as ferro-manganese, ferro molybdenum or silico manganese is used in depositing the hard surface material.

The improved friction bearing of the present invention has been found to have extended life under high loading conditions such as are normally encountered in earth boring drill bits.

What is claimed is:
1. An earth boring drill bit, comprising
   a head,
   a shaft projecting from said head,
   a conical cutter adapted to rotate about said shaft,
   a first tungsten carbide fired deposit around said shaft near the head end of said shaft,
   a second tungsten carbide fired deposit around said shaft near the opposite end of said shaft,
   said shaft defining a ball race recess between said fired deposits,
   said conical cutter defining a first recess having a diameter larger than the diameter of said first fired deposit, a second recess having a diameter larger than the diameter of said second fired deposit and a ball race recess between said first and second recesses,
   a first sintered tungsten carbide bushing having a diameter slightly larger than the diameter of said first recess and adapted to be inserted into said first recess whereby said cutter maintains said first bushing in compression,
   a second sintered tungsten carbide bushing having a diameter slightly larger than the diameter of said second recess and adapted to be inserted into said second recess whereby said cutter maintains said second bushing in compression,
   said first bushing engaging said first fired deposit, said second bushing engaging said second fired deposit and said ball race recess in said cutter coacting with said ball race recess in said shaft to define a race for ball bearings when said cutter is mounted on said shaft, and
   ball bearings positioned in said ball race,
   said fired deposits being tungsten carbide particles in a size range of 30 mesh and smaller with a substantial portion of said particles being in a size range of minus 40 mesh and deposited onto said shaft with a mild steel matrix,
   said bushings being tungsten carbide particles having a size range of 6 microns and less.
2. A friction bearing between two members, which are adapted to move relative to each other, comprising
   a tungsten carbide bearing surface on one of said members, and
   a sintered tungsten carbide insert,
   said insert being contained in compression by said other member in a position engaging said tungsten carbide bearing surface.

3. An earth boring drill bit according to claim 1, wherein
   said first and second recesses in said cutter being sufficiently small with respect to said first and second bushings whereby said bushings when installed in said recesses are loaded in compression to at least 100,000 p.s.i.
4. An earth boring drill bit according to claim 1, wherein
   said first and second recesses in said cutter being sufficiently small with respect to said first and second bushings whereby said bushings when installed in said recesses are loaded in compression to at least 160,000 p.s.i.
5. An earth boring drill bit according to claim 1, wherein
   the tungsten carbide particles used in said bushings have a size in the range from 0.8 to 5 microns.
6. A friction bearing according to claim 2, wherein the compression on said insert is at least 100,000 p.s.i.

References Cited

UNITED STATES PATENTS

| | | | |
|---|---|---|---|
| 1,721,416 | 7/1929 | Schroter. | |
| 1,843,768 | 2/1932 | Hoyt | 308—237 |
| 2,253,969 | 8/1941 | Dawihl | 308—237 |
| 2,444,724 | 7/1948 | Brown | 175—372 |
| 2,490,543 | 12/1949 | Robertson | 308—237 X |
| 2,595,903 | 5/1962 | Swart | 308—8.2 |
| 2,644,671 | 7/1953 | Ingram | 308—8.2 X |
| 2,685,545 | 8/1954 | Sindeband. | |
| 2,696,413 | 12/1954 | Wheildom. | |
| 2,752,210 | 6/1956 | Clark. | |
| 2,823,055 | 2/1958 | Booth. | |
| 2,874,007 | 2/1959 | Cametti | 308—237 X |
| 2,904,374 | 9/1959 | Boice | 308—8.2 |
| 3,151,691 | 10/1964 | Goodwin | 308—8.2 |
| 3,155,439 | 11/1964 | Guzewicz | 308—237 X |
| 3,285,680 | 11/1966 | Dailey | 308—237 |

OTHER REFERENCES

Powder Metallurgy, Philip H. Smith, Scientific American, February 1939; pp. 80 to 82.

Cemented-Carbide Bearings, James R. Longwell, American Machinist, July 5, 1945; pp. 128 and 129.

EDGAR W. GEOGHEGAN, Primary Examiner

L. L. JOHNSON, Assistant Examiner

U.S. Cl. X.R.

175—371, 372; 308—237, 241